United States Patent

[11] 3,586,844

[72] Inventor Richard B. Hanbicki
Princeton Junction, N.J.

[21] Appl. No. 734,670
[22] Filed June 5, 1968
[45] Patented June 22, 1971

[73] Assignee Madatron-Princeton, Inc.
Rocky Hill, N.J.

[54] ELECTRONIC SLIDE RULE
11 Claims, 9 Drawing Figs.

[52] U.S. Cl. .......... 235/167, 235/160, 235/154
[51] Int. Cl. .......... G06f 7/52
[50] Field of Search .......... 235/164, 160, 159, 156, 154, 152, 167

[56] References Cited

UNITED STATES PATENTS

| | | | |
|---|---|---|---|
| 3,327,100 | 6/1967 | Slavin | 235/150.53 |
| 3,402,285 | 9/1968 | An Wang | 235/160 |
| 3,436,533 | 4/1969 | Moore et al. | 235/154 |

*Primary Examiner*—Malcolm A. Morrison
*Assistant Examiner*—David H. Malzahn
*Attorney*—Ostrolenk, Faber, Gerb and Soffen

ABSTRACT: A system for performing mathematical computations based upon logarithmic principles. A magnetic drum, or other suitable memory means, is provided with pulses spaced in logarithmic fashion to represent the C-scale. The second track of the memory is provided with pulses spaced in such a manner as to represent the L-scale. The performance of a multiplication operation, for example, takes place by: inserting the multiplicand and multiplier into two registers; developing a count in accordance with the C-scale pulses in a first counter and simultaneously therewith inserting pulses from the L-scale track into an accumulator; terminating the count in the first counter and clearing the counter as soon as the count in the first counter and the multiplicand compare; when the first counter is cleared, pulses from the C and L-scale are then inserted into the first counter and the accumulator, respectively; this continues until the count in counter 1 compares with the multiplier in register B, at which time the operation is terminated; the count accumulated in the first counter is then cleared, and L-scale and C-scale pulses are then inserted into the first counter and a second counter, respectively; as soon as the count in the first counter compares with the count in the accumulator, the operation is terminated and a binary-to-decimal converter is activated, coupling the output of the second counter to a character display and/or printer for visual observation. A division operation is performed in a similar manner, except that the L-scale pulses representing the divisor are subtracted from the first group of pulses accumulated, representing the dividend. Operations such as sine, cosine and tangent functions may be performed in a similar manner.

INVENTOR
RICHARD B. HANBICKI
By OSTROLENK, FABER, GERB & SOFFEN
ATTORNEYS

INVENTOR
RICHARD B. HANBICKI

BY

OSTROLENK, FABER, GERB & SOFFEN
ATTORNEYS

INVENTOR.
RICHARD B. HANBICKI
BY
OSTROLENK, FABER, GERB & SOFFEN
ATTORNEYS

INVENTOR.
RICHARD B. HANBICKI
BY
OSTROLENK, FABER, GERB & SOFFEN
ATTORNEYS

ELECTRONIC SLIDE RULE

BACKGROUND OF THE INVENTION

This invention relates to computational devices, and more particularly to a computer system for performing mathematical calculations based upon a logarithmic principle.

There has been a great demand for high-speed computational devices in business, industry and educational fields for accounting, scientific, research, inventory, and a variety of other purposes. The greatest progress in computational systems has taken place in the electronic field, especially in the form of digital data processing and digital computer systems.

It is a primary object of the present invention to provide a high-speed electronic computational system which is based upon logarithmic principles which is relatively simple in design and construction and which may be operated in a straightforward manner.

The present invention, which may be referred to as an electronic slide rule, in its simplest form, is comprised of a memory means which, in one preferred embodiment, may be comprised of a magnetic drum memory having a plurality of tracks in which numerical and logarithmic information is stored in the form of magnetic patterns representing specific scales of the conventional slide rule. For example, one track is provided with magnetic patterns which is spaced in the manner representing the C-scale of a slide rule. A second track arranged in a predetermined spatial relationship with the C-scale track is provided with a magnetic pattern representing the L-scale of the conventional slide rule. Computations are performed by converting the numbers involved in the computation into their logarithms, adding or subtracting the logarithms in accordance with the type of mathematical operation to be performed (i.e., multiplication or division, for example) and the converting the resultant logarithm back into first binary and then decimal form, either for display purposes or for the purpose of utilizing the resultant answer in a subsequent calculation. Additional slide rule scales may be provided upon the drum to perform additional operations such as sine, cosine, tangent, square root, cube root, exponentiation and other functional operations.

It is, therefore, one primary object of the present invention to provide a novel electronic computer employing logarithmic principles.

Another object of the present invention is to provide a novel electronic computer employing logarithmic principles wherein the scales of a conventional mechanical slide rule are reproduced in memory means to permit conversion of the numbers in the mathematical operation into their equivalent logarithms, which logarithms are then added or subtracted in conventional fashion to obtain the resultant answer which is then converted back into decimal form for either visual display or subsequent mathematical operations.

These as well as other objects of the present invention will become apparent when reading the accompanying description and drawings in which:

FIG. 1 shows a block diagram of an electronic calculator designed in accordance with the principles of the present invention.

FIG. 1*a* shows the manner in which L and C-scales may be provided in the memory of FIG. 1.

FIG. 2 is a block diagram showing the register of the calculator of FIG. 1 in greater detail.

FIGS. 3*a* through 3*d* are block diagrams showing components of the programmer employed in the calculator of FIG. 1 in greater detail.

Figure 1:
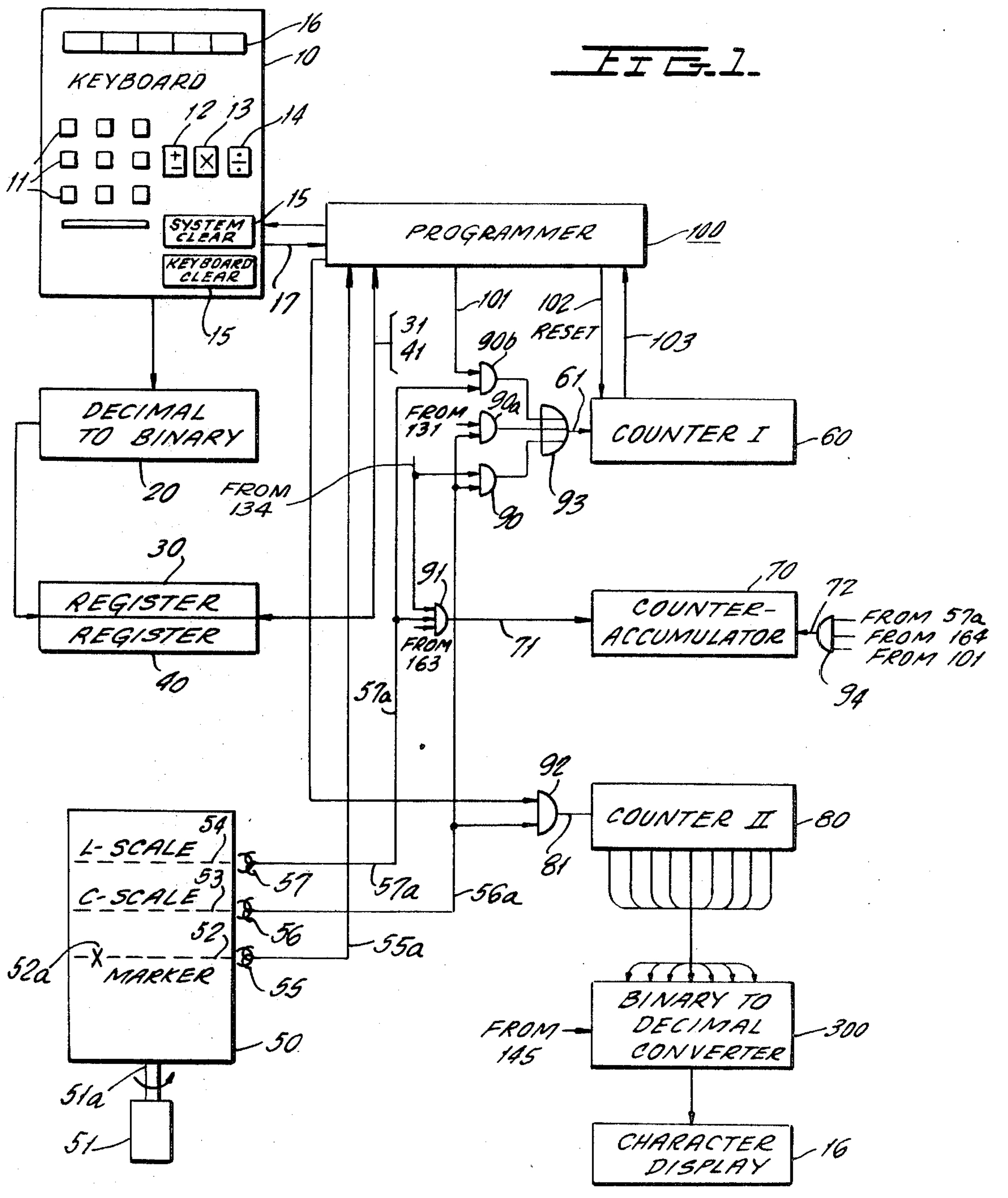

Making reference to the drawings and most particularly to FIG. 1, there is shown therein an electronic calculator comprised of a keyboard 10 for inserting data into the system and for controlling the particular mathematical operations desired. While the arrangement of the figures shown herein perform the most basic and fundamental mathematical operations, it should be understood that the system is capable of performing much more advanced and sophisticated computations with very little alteration to the system, as will become obvious from a consideration of the description set forth hereinbelow.

The keyboard assembly of FIG. 1 is comprised of a 10-key information input group 11, which keys represent the decimal numbers 0 through 9. The function keys provided (in one simple arrangement) include an input key 12, a multiply key 13, a divide key 14 and a clear key 15. A visually observable character display 16 is provided to permit the operator to observe the inputed data to ascertain that the appropriate keys have been depressed. The character display system may be of the type described in copending application Ser. No. 718,553 filed Apr. 3, 1968, and assigned to the assignee of the present invention. Obviously, any other type of character display system may be employed. The operation of the keyboard is as follows:

In the case of a multiplication operation where, for example, the number 86 is to be multiplied by the number 95, the information keys "8" and "6" are depressed. The character display 16 is observed to determine whether the appropriate keys have been depressed. If the correct keys have been depressed, the "input" key 12 is depressed to insert this number into one of the two registers (to be more fully described) after the number undergoes a decimal-to-binary conversion. The keys "9" and "5" are then depressed, and the character display 16 is again observed to determine whether the correct number has been inserted. Assuming insertion of the correct number, the "input key" 12 is depressed to insert the number 95 into another register of the multiple register group after undergoing decimal-to-binary conversion. If any of the numbers inserted are incorrect, the clear button 15 is depressed to clear the machine, and the numbers are then reinserted. Assuming insertion of the appropriate numbers, the multiplication key 13 is then depressed to initiate the computation.

Each number employed in the mathematical operation is transferred from the keyboard 10 to a decimal-to-binary conversion circuit 20, which circuits are well known in the art and will not be described herein in detail for purposes of simplicity. Suitable decimal-to-binary converters are described in detail in the text "Arithmetic Operations in Digital Computers" by R.K. Richards, copyright 1955 by the D. Van Nostrand Co. Inc. publishing company, a description of such converters appearing on pages 12—13, 286—290 and 311—313.

The binary coded output of the number inserted appears in parallel fashion at the output terminals of conversion circuit 20 to be selectively impressed upon one of the registers 30 or 40, for purposes to be more fully described.

The electronic calculator is further comprised of a magnetic memory means 50 which, in one preferred embodiment, is a magnetic drum memory continuously rotated at a constant angular velocity by motor means 51 which drives the magnetic memory drum 50 by means of output shaft 51*a*. In the simplified embodiment described herein, the magnetic drum memory 50 is provided with a coating or surface of suitable magnetic material which has at least tracks 52, 53 and 54 provided thereon. Track 52 is a marker track having one pulse located at 52*a* to indicate the starting points for the other tracks, which track 52 operates in a manner to be more fully described. Track 53 is provided with magnetic patterns representing pulses which are physically spaced in a manner equivalent to the C-scale of a conventional slide rule. In the embodiment described herein, the magnetic patterns representing the scales of a conventional slide rule are shown for the decimal system to simplify the description of the invention. However, it should be understood that the preferred arrangement consists of a C-scale whose magnetic pattern represents the binary system as opposed to the decimal system.

Figure 1A:
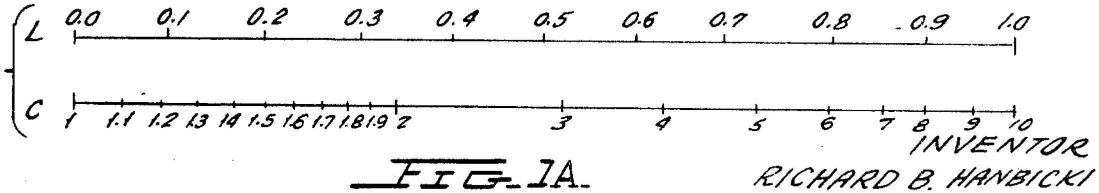

Track 54 is comprised of a magnetic pattern representing the L-scale of a conventional slide rule. FIG. 1a shows the arrangement of the tracks substantially as they would appear on a conventional slide rule. It should be understood, however, that when a magnetic drum memory is employed, these tracks are arranged around the circumference of the magnetic drum memory so that their left-hand and right-handmost ends meet at one starting point on the drum surface which is identified by the marker pulse 52a provided in the marker track 52. Readout of the magnetic patterns provided in tracks 52 through 54 for conversion of the patterns into electrical pulses is performed by the readout heads 55 through 57, respectively, which are selectively coupled to the programmer 100 and the counters 60 through 80 to enable performance of the mathematical calculations.

A first counter 60 employed during the performance of the mathematical calculation is provided with an input terminal 61 for advancing the count in the counter by a unit amount each time a pulse is applied to its input. The counter is comprised of a plurality of bistable stages of a number sufficient to store either numbers or the logarithmic equivalent of numbers up to the capacity of the calculator. Counter 80 is basically of the same type as counter 60 and is provided with an input terminal 81 for advancing the count in unit steps for each pulse applied to its input terminal. The number of bistable stages provided in counter 80 is sufficient to store numbers or their logarithmic equivalents up to the capacity of the calculator. The parallel output of the counter 80 is coupled to a binary-to-decimal converter 300 which is activated by means to be more fully described for converting the binary number in counter 80 into decimal fashion for display in the character display 16 which constitutes a display of the answer generated as the result of the mathematical operation.

The counter-accumulator 70 is a counter comprised of a sufficient number of bistable stages capable of storing logarithms up to the capacity of the calculator, and is provided with a first input terminal 71 for advancing the count stored in the counter in unit fashion each time a pulse is applied to this input terminal. A second input terminal 72 is provided for "-counting down," or for reducing the count in the counter of the accumulator in unit fashion each time a pulse is applied to input terminal 72. As is well known in the use of logarithms, addition of two or more logarithms is equivalent to a conventional multiplication operation, whereas the subtraction of one logarithm from another is equivalent to a division operation. Thus, the reversible counter-accumulator circuit is employed for purposes of performing either of the two mathematical operations.

The control of the calculator is performed by the programmer 100 which sequentially controls each step in a predetermined order for the performance of a calculation.

In order to best describe the invention, a simplified description of the calculator operation will first be given, which will then be followed by a more detailed description in which more specific consideration will be given to the circuitry of the programmer:

Let it be assumed that a multiplication operation is to be performed wherein the number 86 is to be multiplied by the number 95.

As was previously described, the numbers 86 and 95 are inserted by means of keyboard 10. The operation of the input key 12 activates the programmer coupled to the keyboard through lead 17 to cause the gating circuitry (to be more fully described) to first insert the number 86 into register 30 and subsequently to insert the number 95 into register 40.

As soon as these steps are completed, the programmer conditions itself for initiation of the next step which takes place as soon as the marker pulse 52a passes beneath its associated readout head 55. At this time, the marker pulse passing to programmer 100 through lead 55a causes the AND gates 90 and 91 to be energized through programmer output lead 134 (which will be more fully described in connection with FIG. 3c. This enables L-scale pulses in track 54 to be picked up by readout head 57 and to be passed through AND gate 91 to the counter-accumulator circuit 70. Simultaneously therewith, the magnetic pattern of the C-scale track 53 is picked up by readout head 56 and passed through AND gate 90 to the input terminal 61 of counter 60.

Programmer 100 is provided with a comparator circuit (to be more fully described) which compares the count in counter 60 appearing at its output leads (represented by only one lead 103) against the count in register 30 applied to programmer 100 by lead 31,41.

As soon as the count in counter 60 compares with the count stored in register 30, input gates 90 and 91 are disabled, preventing any more output pulses generated by readout heads 56 and 57 to be applied to the input terminals 71 and 61, respectively. At this time, counter 60 has stored therein the same number as register 30, while counter-accumulator 70 has stored therein the logarithm of this number.

Programmer 100 advances to the next step which causes counter 60 to be cleared after a predetermined delay and begins the next step which is comprised of enabling AND gates 90a and 91, which cause C-scale pulses picked up by readout head 56 to be applied to the input terminal 61 of counter 60 through OR gate 93 which is provided for a purpose to be more fully described. Simultaneously therewith, L-scale pulses are passed by AND gate 91 to the input terminal 71 of counter-accumulator circuit 70, causing the logarithm of the number 95 to be added to the logarithm of the number 85 already stored in counter-accumulator 70. The gates 90a and 91 are disabled as soon as the count in counter 60 compares with the count in register 40, which compare operation is performed by a comparator provided in programmer 100. The counter 60 is then cleared, and the readout head 57 is coupled to one input of AND gate 90b which is enabled by programmer 100 to pass L-scale pulses into counter 60. Simultaneously therewith, the programmer 100 enables AND gate 92 to pass C-scale pulses into counter 80. Programmer 100 compares the count stored in counter-accumulator circuit 70 against the count being developed in counter 60 until they compare, at which time gates 90b and 92 are disabled. Programmer 100 then enables the output stored in counter 80 to be converted by binary-to-decimal converter 300 for display by the character display 16.

Division operates in a fashion substantially similar to that described, except that the divisor is inserted into the counter-accumulator circuit 70 by means of gate 94 which is coupled to the input terminal 72 of circuit 70, causing the binary count representing the logarithm of the number 95 to be subtracted from counter-accumulator 70.

Although only multiplication and division operations have been described herein, it should be obvious that additional mathematical manipulations may be performed such as trigonometric functions (i.e., sine, cosine, tangent, etc.) square root, cute root, exponentiation and so forth.

Although the programmer 100, to be described in greater detail herein below, is set forth as being a substantially fixed pattern programmer, it should be understood that the description of the programmer set forth herein is merely for purposes of simplicity and other more sophisticated and more flexible programming circuits may be employed to provide for the performance of more exotic calculations. For example, the programmer to be described hereinbelow, instead of being a fixed format programmer, can be of the stored program type which is employed in widespread fashion throughout modern day electronic computers wherein program steps are stored within a computer memory and further wherein program steps themselves may be exposed to mathematical manipulation for the purpose of substantially broadening the capabilities of the mathematical operations which may be performed by the calculator.

Figure 2:
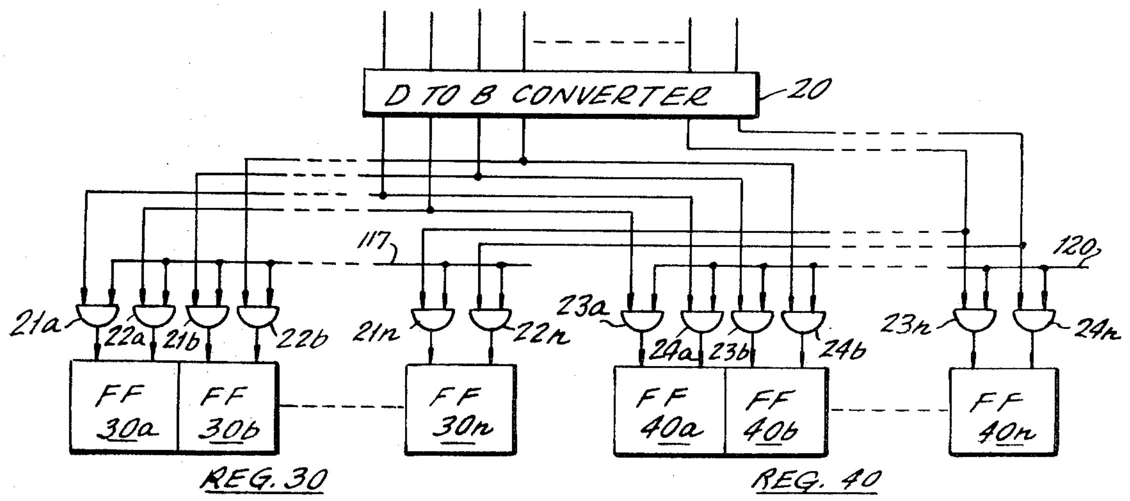
Figure 4:
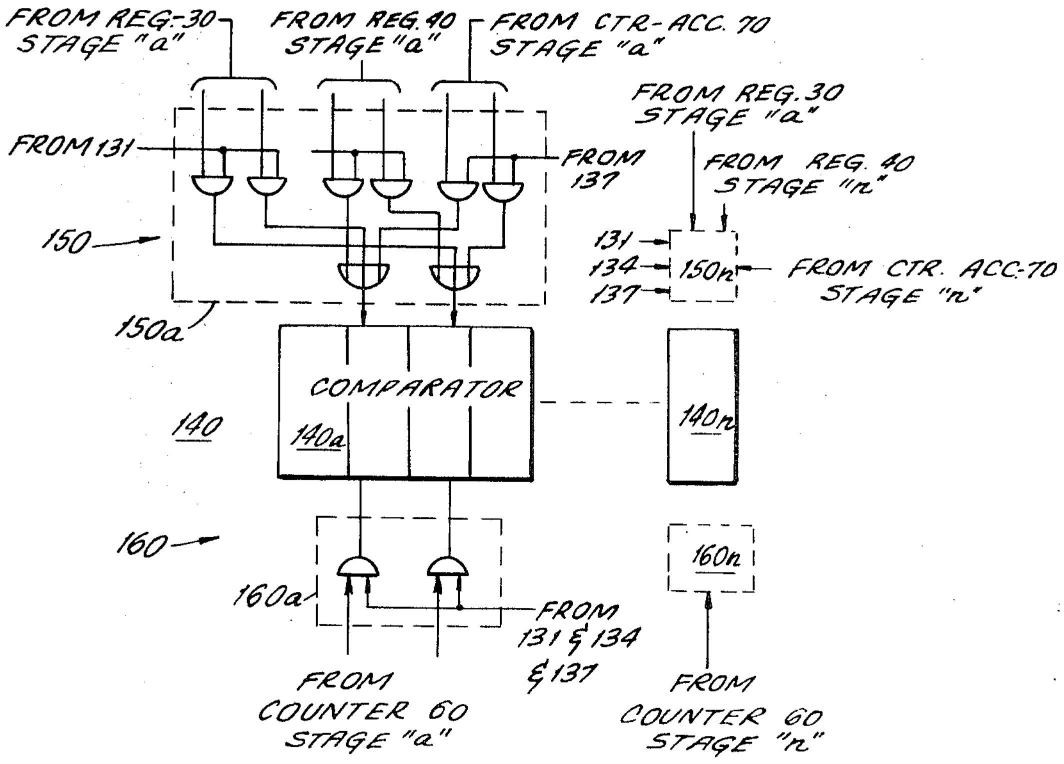
FIG. 4 is a block diagram showing a comparator of FIG. 3*d* in greater detail.

FIGS. 2 through 4 show detailed views of some of the circuitry which may be employed in programmer 100. The manner in which the keyboard information may be inserted in the registers 30 and 40 may, for example, utilize the circuit 110 of FIG. 3*a* which is comprised of a shift register having stages 111*a* through 111*c*. The shift register may be reset through the application of a pulse applied to bus 116, completely clearing all stages of the shift register. Pulses are inputed to the shift register at input terminal 115 which constitutes the output terminal of an AND gate 112.

Let it be assumed that the first number in the mathematical operation is inserted into the keyboard by selective depression of the keyboard key group 11. After it has been ascertained by observations of the character display 16 that the correct number has been inserted, the input function key 112 is depressed. This applies a pulse to one input terminal of AND gate 12 whose other input terminal (the inhibit input terminal) is coupled to one output of another programmer circuit to be more fully described. For the purpose of understanding the circuitry of FIG. 3*a*, let it be assumed that inhibit input terminal 115*a* is at a level enabling AND gate 112 to pass pulses. Depression of the input function key 12 applies a pulse to AND gate 112 which is passed to input terminal 115, causing the output terminal 117 of stage 111*a* to go to the binary 1 state. This condition is simultaneously applied to the delay circuit 113 (which may, for example, be a monostable multivibrator) and to the bus 117 shown in FIG. 2, which bus is coupled to all inputs of the AND gate groups 21*a*—21*n* and 22*a*—22*n*. This enables all of the AND gates, allowing the number undergoing conversion in decimal-to-binary converter 20 to be applied to the appropriate flip-flop stages 30*a* through 30*n* of register 30. Each flip-flop stage is provided with two inputs so as to be able to drive the stage to either of its two binary states to store the binary equivalent of the decimal number inserted into the keyboard.

The triggering of delay circuit 113 by the output pulse appearing at terminal 117 of first shift register stage 111*a* causes the output of monostable multivibrator 113 to go to binary 1 after a predetermined delay period. This binary 1 output is applied to input terminal 119 which is passed by AND gate 112 to shift the pulse in stage 111*a* to stage 111*b*. This removes the pulse appearing at output terminal 117 to disable the AND gate groups 21*a*—21*n* and 22*a*—22*n*. The binary 1 pulse at this time is contained in stage 111*b* which does not have its output terminal connected to any peripheral circuitry.

The next decimal number to be utilized in the mathematical calculation is then inserted into keyboard 10 and, once the operator is satisfied that the correct number has been inserted by observation of character display 16, the input function key 12 is depressed, applying a pulse to input terminal 119 which is passed by AND gate 112, causing the binary 1 state stored therein to be shifted to stage 111*c*. This causes a binary 1 pulse to appear at the output terminal 120 which is applied to the AND gate groups 23*a*—23*n* and 24*a*—24*n*, coupling the output terminals of decimal-to-binary converter 20 to the appropriate inputs of the flip-flop stages 40*a*—40*n* of register 40. Thus, the next number utilized in a mathematical calculation is inserted and stored in register 40. The output terminal 120 is also simultaneously applied to one input of a delay circuit 114 which may, for example, be a monostable multivibrator whose output terminal goes to binary 1 state a predetermined time period after application of the output pulse appearing at terminal 120. This pulse is applied to the reset input terminal 116, causing the shift register stages to be cleared in readiness for subsequent operation. Obviously, if desired, the entire system may be cleared by depressing the system clear button 15 provided as part of keyboard 10 which enables all circuits of the calculator to be cleared, and differs from the clear button 15*a* which causes the number inserted into the keyboard to be cleared and not the entire system.

Figure 3A:
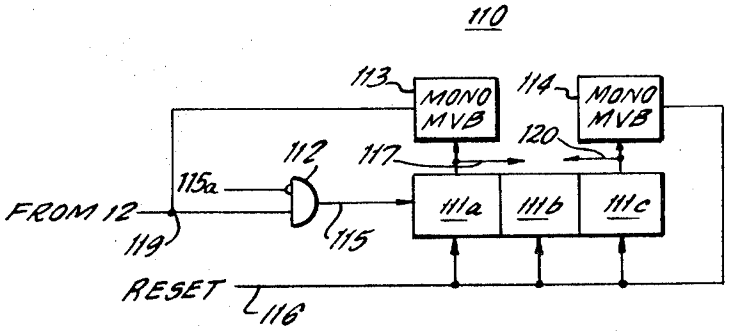
Figure 3B:
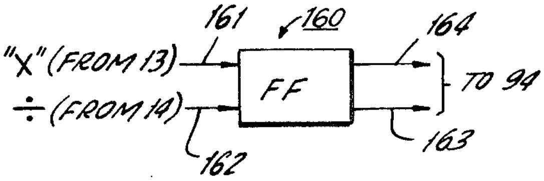
Figure 3C:
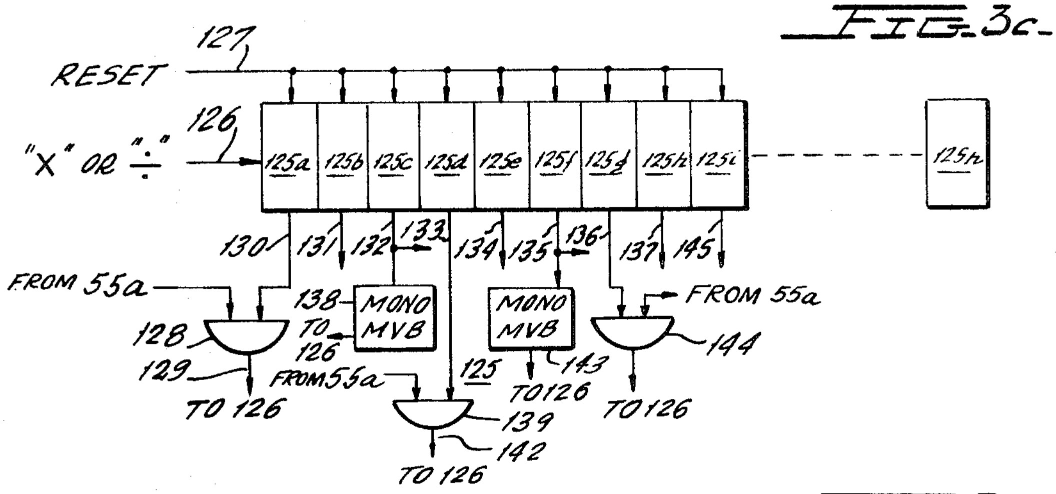

FIG. 3*c* shows the fixed pattern programmer which may be employed as part of the present invention. Programmer 125 is comprised of a multistage shift register having stages 125*a* through 125*n* wherein the total number of stages provided is dependent only upon the variety of mathematical operations desired to be performed. For purposes of simplicity, the fixed pattern programmer shown in FIG. 3*c* has been limited to circuitry sufficient to describe performance of a multiplication and division operation. Obviously, other calculations may be performed by providing appropriate stages within the programmer. The shift register may be initially reset through the application of a reset input pulse at bus 127 to clear all stages of the shift register.

Let it be assumed that the programming circuit 125 has been cleared, that numbers have been entered into the keyboard for performing a multiplication operation and that the multiplication function key 13 has been depressed. Depression of key 13 applies a pulse at input terminal 126, causing the first stage 125*a* of the shift register to go to the binary 1 state. Its output terminal 130 applies a binary 1 pulse to one input of AND gate 128 whose other input terminal is coupled to readout head 55 through lead 55*a*. While not shown, it should be obvious that a suitable amplifier may be coupled between readout head 55 and the input to AND gate 128 to assure the fact that a pulse of sufficient level is applied to the AND gate. The output terminal 129 of AND gate 128 is coupled to shift register input terminal 126, causing the binary 1 state stored in first stage 125*a* to be shifted to stage 125*b* which develops a pulse at its output terminal 131. Output terminal 131 is coupled to gates 90 and 91, shown in FIG. 1, and is simultaneously coupled to the first and second gate groups 150 and 160 of comparator circuit 140, shown in FIG. 3*d*. The application of binary 1 states to AND gates 90 and 91 enable these gates to pass output pulses generated in the readout heads 56 and 57, respectively, causing the count of a number to be developed in counter 60 and its logarithmic equivalent to be developed in counter-accumulator 70. The simultaneous application of enabling pulses to first and second gate groups 150 and 160 of comparator circuit 140 couples the outputs of register 30 (through first gate group 150) to comparator 140 and couple the outputs of counter 60 (through second gate group circuitry 160) to the comparator which continuously compares the count being developed in counter 60 against the count stored in register 30. As soon as the counts in the register 30 and counter 60 compare, comparator circuit 140 generates a pulse at its output terminal 141 which is applied to the shift input terminal 126 of programmer circuit 125, causing the binary 1 state stored in stage 125*b* to be shifted into stage 125*c*. This causes a pulse to be developed at the output terminal 132 of third stage 125*c* which is applied to the reset input terminal 102 of counter 60 for the purpose of clearing counter 60 in readiness for the next operation. The pulse developed at output terminal 132 is simultaneously applied to a delay circuit 138 which may, for example, be a monostable multivibrator whose output terminal goes to binary 1 state a predetermined period after application of a pulse to its input terminal to provide sufficient time for counter circuit 60 to be cleared and reset. The output of the monostable multivibrator is applied to the shift pulse input terminal 126, causing the binary 1 state in the third stage 125*c* to be shifted into the fourth stage 125*d*, developing a pulse at its output terminal 133. Output terminal 133 is applied to one input of AND gate 139 whose other input is coupled to readout head 55 through output lead 55*a* which enables AND gate 139 as soon as the marker pulse 52*a* passes beneath readout head 55. As soon as AND gate 139 is enabled, its output terminal 142 applies a pulse to shift pulse input terminal 126, causing the binary 1 state in stage 125*d* to be shifted to stage 125*e*, developing a pulse at its output terminal 134. The output terminal 134 is coupled to first gate group 150 of comparator circuit 141, second gate group 160 and to AND gates 90 and 91, shown in FIG. 1. This enables pulses from the L-scale track sensed by readout head 57 to be applied to counter accumulator circuit 70; pulses from the C-scale track picked up by readout head 56 to be applied to counter circuit 60; and further couples the output terminals of register 40 through first gate group 150 to comparator 140 while coupling the output terminals of counter 60 through second gate group 160 to comparator circuit 140. As was previously described, it was indicated that the marker pulse 52*a* provided in marker pulse track 52 is positioned to indicate the starting points of both the L and C-scales. As has been described, the marker pulse causes the shift register to be advanced by one stage before the AND gates 90 and 91 are enabled to pass L and C-scale pulses to the appropriate counters. It should be obvious that any such delay inherent in the operation speed of the shift register may be fully compensated for by positioning the marker pulse relative to the starting points of the L and C-scales so that pulses will be generated in the readout heads in synchronism with the time that the pulse has been shifted to the stage which enables the AND gates 90 and 91 which pass the L and C-scale pulses. As another alternative in cases where the memory means rotates at relatively low angular velocity such as, for example, 180 r.p.m. or less, the shifting speed of the electronic circuitry is so fast that no compensating techniques need be undertaken with regard to positioning of the marker pulse 52*a* relative to the L-scale and C-scale starting points.

The comparator circuit 140 compares the count being developed in counter 60 against the count stored in register 40 until the two numbers compare, at which time comparator 140 generates a pulse at its output terminal 141 which is coupled to the shift pulse input terminal 126, causing the binary 1 state stored in stage 125*e* to be shifted to stage 125*f*. This results in a pulse being generated at the output terminal 135 which is simultaneously applied to the input of delay circuit 143 (which may, for example, be a monostable multivibrator) and to the reset or clear input terminal of counter circuit 60. Counter 60 is then cleared and reset and, after a predetermined time delay, the output of delay circuit 143 goes to the binary 1 state which condition is applied to the shift pulse input terminal 126, causing binary 1 state stored in stage 125*f* to be shifted to stage 125*g*. This causes a pulse to be generated at output terminal 136 which is applied to one input terminal of AND gate 144 whose other input terminal receives the generated marker pulse from readout head 55 through lead 55*a*. The enablement of AND gate 144 causes a pulse to be applied to the shift pulse input terminal 126, shifting the binary state to stage 125*h* which generates a pulse at its output terminal 137.

Output terminal 137 is coupled to one input of AND gate 90*a* and one input of AND gate 92 which enables L-scale pulses picked up by readout head 57 to be applied to counter 60, and further enables C-scale pulses picked up by readout head 56 to be applied to counter 80. Output terminal 137 is further coupled to first and second gate groups 150 and 160 of comparator circuit 140, causing the count in counter-accumulator circuit 70 to be coupled (through first gate group 150) to comparator 140 and causing the count of L-scale pulses being generated in counter 60 to be coupled (through second gate group 160) to comparator 140. As soon as the count in counter 60 is equal to the count stored in counter-accumulator 70, comparator 140 generates a pulse at its output terminal 141 which is coupled to shift pulse input terminal 126, causing the binary 1 state stored in stage 125*h* to be shifted to stage 125*i* and thereby developing a pulse in output terminal 145. The removal of the pulse from output 137 obviously terminates the insertion of counting pulses into counter 60 and counter 80.

The output 145 of stage 125*i* is coupled to the enabling input terminal 301 of binary-to-decimal converter circuit 300, enabling the C-scale count developed in counter 80 to be passed by binary-to-decimal converter 300 to the character display 16. Although, as shown herein, the character display is used in common for both display of input numbers and display of the completed mathematical operation, it should be obvious that plural displays may be employed, if desired.

In the case where a division operation is to be performed, the flip-flop circuit 160 of FIG. 3*b* is utilized. Flip-flop 160 is provided with a pair of input terminals 161 and 162 and a pair of output terminals 163 and 164. In the case where multiplication operation is performed, the depression of the multiplier function key 13 applies a pulse to input terminal 161, causing output terminal 163 to go to binary 1 state. This is applied to one input of the three-input AND gate 91, enabling the L-scale pulses to be applied in an additive fashion to counter-accumulator circuit 70. These pulses are additively applied during the time in which the multiplier and multiplicand stored in registers 40 and 31, respectively, are compared against the count being generated in counter 60.

In the case where a division operation is performed, the depression of the division function key 14 activates the shift register circuit 125, shown in FIG. 3*c*, in the same manner as was previously described. However, at the time that the output terminal 134 of stage 125*e* generates a binary 1 output which is simultaneously applied to ANd gate 91 and to AND gate 93, the depression of the division function key 14 applies a pulse to input terminal 162 of bistable flip-flop 160, causing the output terminals 163 and 164 to go to the binary zero and binary 1 states, respectively. This disables ANd gate 91, while enabling AND gate 93, causing the pulses of the divisor to be subtractively inserted into counter-accumulator 70. All other steps of the division operation are basically the same as has been described hereinabove. As was previously mentioned, additional mathematical calculations may be performed simply by adding additional function scales to the magnetic drum memory such as sine scales, cosine, scales, tangent scales, square root scales, exponentiation scales and so forth. The coupling of the programmer shift register stages may be preset by additional function keys provided in the keyboard (and not shown) to perform the mathematical calculations of sine, cosine, tangent, square root, cube root, exponentiation and so forth. As an obvious alternative, the programmer described herein may be substituted by a programmer of the stored memory means which may, for example, be comprised of a random access memory operated under the control of a counter for extracting each operational step from memory in a preset fashion, dependent upon the particular mathematical calculation to be performed. Whereas the memory means for storing the scales described herein, in the preferred embodiment, is comprised of a magnetic drum means, it should be understood that magnetic tape means may be employed, if desired, In addition thereto, the drum may be replaced by an optical-type storage means wherein the pulses may be stored on a moving surface (such as, for example, a drum) in the form of contrasting light and dark segments which are sensed by suitable light-sensitive means. The arrangements of the alternating light and dark segments may be in conformity to the L and C-scales 54 and 53, shown in FIG. 1*a*, or any other scales which may be provided within the memory means.

Figure 3D:
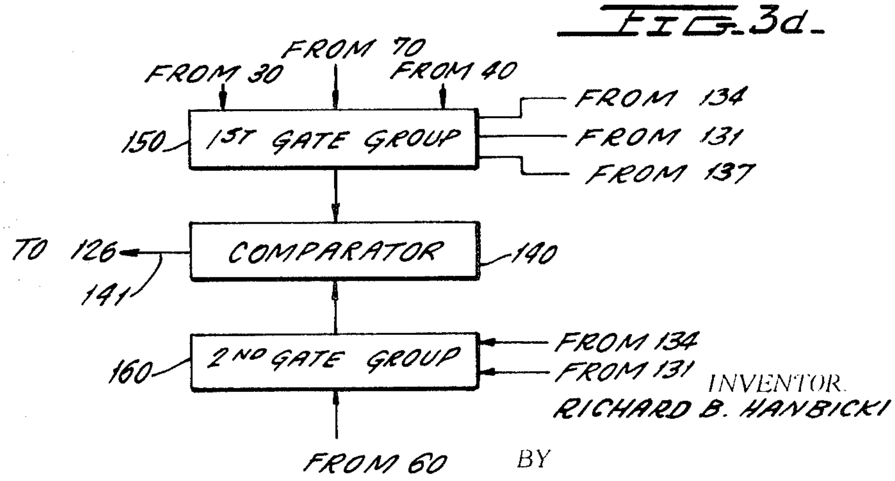

FIG. 4 shows the comparator circuit 140 of FIG. 3*d* in greater detail. The comparator circuit 140 is comprised of a plurality of stages 140*a* through 140*n*, each of which may be comprised of an exclusive OR circuit of the type described in copending application Ser. No. 718,553, referred to hereinabove. Each of the stages 140*a* through 140*n* is coupled to two output terminals from each of the first gate group circuits 150*a*—150*n* and second gate group circuits 160*a* through 160*n*, respectively. Each of the second gating circuits 160*a* through 160*n* is provided with a pair of AND gates which are enabled by signals received from either output terminal 131 or 134 from the programmer shift register 125. The other input terminals are coupled to two output terminals of an associated stage of counter 60.

Each of the first gate groups 150*a* is comprised of three pairs of AND gates, each of which pairs have their input terminals coupled to associated output terminals of associated stages of the registers 30 and 40 and the counter-accumulator 70. For example, during the multiplication or division operation, when the multiplicand (or the dividend) is being converted into its logarithmic form, output terminal 131 of FIG. 3*c* is binary 1, enabling the AND gate pair associated with register 30 to couple its output terminals to comparator 140. At this time, output terminals 134 and 137 of FIG. 3*c* are at the binary 0 level, disabling their associated AND gate pairs.

When the multiplier (or divisor) is being converted into its logarithmic form, output terminals 131 and 137 of FIG. 3c are at the binary 0 level, while output terminal 134 is at the binary 1 level, enabling its associated AND gate pairs to coupled the stages of register 40 to the associated stages of comparator 140.

When the conversion of the resultant logarithmic quantity back to its decimal (or binary) form is being performed, output terminals 131 and 134 are in the binary 0 state, while output terminal 137 is in the binary 1 state, coupling the stages of counter-accumulator 70 to associated stages of the comparator 140 through the appropriate AND gate pairs for the purpose of comparing the logarithmic quantity in counter-accumulator circuit 70 against the logarithmic quantity being developed in counter 60. The OR gates provided in each first gate group 150*a* through 150*n* are provided for the purpose of coupling the outputs of only that pair of AND gates which have been enabled to the appropriate input terminals of the associated comparator stage 140*a* through 140*n*, respectively.

Figure 5:
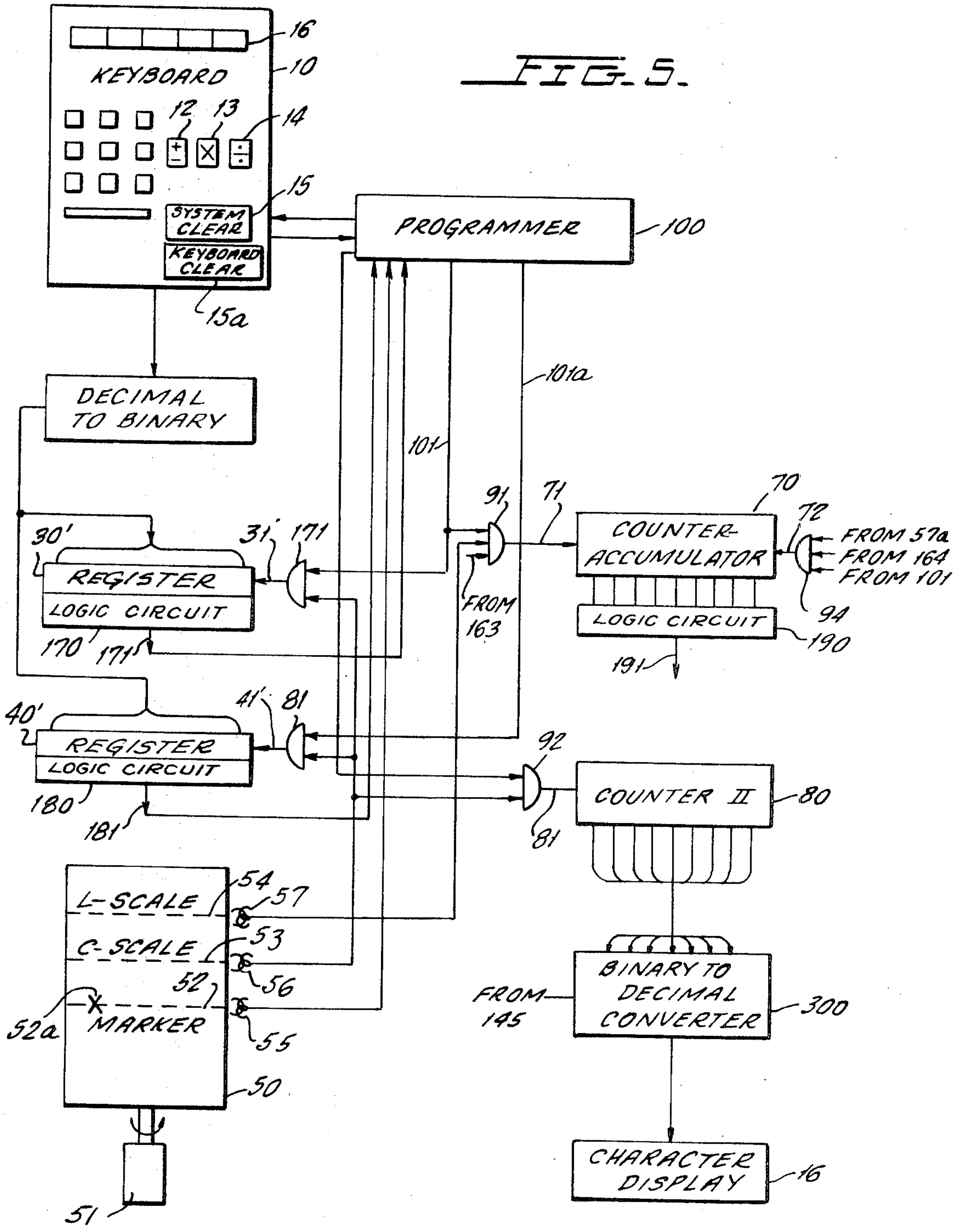
FIG. 5 is a block diagram showing an alternative embodiment for the arrangement of FIG. 1.

FIG. 5 shows an alternative embodiment for the arrangement of FIG. 1 wherein it is possible to eliminate the counter 60 in the following manner (it being understood that all like component as between FIGS. 1 and 5 have been designated by like numerals):

The registers 30 and 40, as shown in FIG. 1 , are replaced in FIG. 5 by countdown counter means 30′ and 40′, respectively, wherein their functions are basically the same as those described with reference to the system of FIG. 1, except that after insertion of the decimal equivalents of the numbers to be multiplied (or divided), these numbers are then counted down in the following manner:

In order to obtain the logarithm of the number contained in register 30′, the C-scale pulses are applied through AND gate 171 to the input 31′ of register 30′ to reduce the count in the register to 0. An indication of the 0 count is provided for by the logic circuitry 170 which yields a signal at its output terminal 171 as soon as all of the stages of register-counter 30′ are in the binary 0 state. This signal causes the next operation controlled by the programmer to be performed, as well as terminating the collection of L-scale pulses within counter-accumulator 70. The next operation consists of counting down or reducing the count within register-counter 40′ until all of its stages are in binary 0 state. Obviously, as is the case with register-counter 30′, the pulses applied to its AND gate 181 are the C-scale pulses from line 56*a*. As soon as the count is reduced to 0, the logic circuit 180 provides a pulse at its output 181 which terminates the collection of L-scale pulses in counter 70 as well as enabling or causing the programmer to step to the next program step.

The next operation is performed by causing the counter-accumulator 70 to be counted down until all of its stages are in binary 0 state, which is indicated by the logic circuitry 190 which generates a pulse at its output terminal 191 as soon as this state is achieved. Countdown may be performed through the use of the AND gate 94 to reduce the count in this counter to 0. While this count is being reduced to 0 count, counter 80 may be employed to accumulate the equivalent C-scale count in the same manner as was previously described. This arrangement eliminates the need for counter 60 and the comparator circuit, as was previously described.

As a further alternative embodiment to the arrangement of FIG. 5, the counter 80 may be eliminated and be substituted by either one of the register-counters 30′ or 40′ in the following manner:

Let it be assumed that the result of the multiplication or division operation (by the logarithm method) is contained within counter-accumulator 70. This result is shifted into either register 30′ or 40′. The L-scale output is then inputed to the countdown input terminal of countdown register-counter 40′ while the -scale output pulses are inputed to the counter-accumulator (by means of AND gate 92). As soon as the register-counter 40′ reaches a 0 count, the counter-accumulator 70 will contain a C-scale equivalent of the logarithmic quantity previously contained within register 40′. This C-scale quantity output may then be converted from binary-to-decimal form by means 300 and displayed by character display means 16.

As a further alternative, counter 80 may be eliminated by transferring the contents of accumulator 70 into either one of the registers 30′ or 40′, step the counter transferred thereto by L-scale pulses from readout head 57; simultaneously step C-scale pulses into accumulator 70 until the contents of register 30′ or 40′ is reduced to zero; and finally convert the count in accumulator 70 by converter 300 which converted quantity is then displayed by display means 16.

It can be seen from the foregoing that the present invention provides a novel electronic calculator employing logarithmic concepts wherein the quantities employed in the mathematical calculation are converted into their logarithmic equivalents through electronic means so as to enable the performance of multiplication and division operations through straightforward addition and subtraction techniques, thereby providing a system of simplicity in design which greatly facilitates the use thereof by an operator.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

I claim:

1. Electronic means for performing mathematical operations upon input information comprising:
memory means;
first means responsive to said memory means for generating equispaced electrical pulses;
second means response to said memory means for generating nonequispaced electrical pulses simultaneously with the operation of said first means, the pulse rates generated by said first and second means being related in a predetermined fashion;
third means for receiving and storing said input information in the form of electrical signals representative of a numerical quantity;
accumulator means coupled to said first means for storing said equispaced pulses;
fourth means including a counter connected only to the output of said second means for storing pulses received from said second means and means responsive to the counts in said counter and said third means for terminating the accumulation of said equispaced pulses in said accumulator means when the number of nonequispaced pulses applied to said counter equals the numerical quantity in said third means.

2. The device of claim 1 wherein
said first means comprises a first information group stored in a first location in said memory means representative of said equispaced pulses and first readout means for sensing and converting said first information into said equispaced electrical pulses;
said second means comprising a second information group stored in a second location in said memory means representative of said nonequispaced pulses and second readout means for sensing and converting said second information group into said nonequispaced electrical pulses.

3. The device of claim 2 wherein said memory means comprises a movable surface and means for moving said surface;
said first means comprises a first pattern representing said equispaced pulses aligned along said surface, said first readout means sensing said first pattern as it passes said first readout means for converting the first pattern sensed into equispaced electrical pulses;
said second means comprising a second pattern representing said nonequispaced pulses being aligned along said surface in spaced relationship to said first pattern, said second readout means sensing said second pattern as it passes said second sensing means for converting said second pattern sensed into nonequispaced electrical pulses.

4. The device of claim 3 further comprising means for driving said drum memory at a predetermined angular velocity.

5. The device of claim 4 wherein said nonequispaced pattern is logarithmically spaced relative to said constant spaced pattern.

6. Electronic apparatus for performing mathematical operations upon input information in the form of numerical quantities comprising:

continuously moving memory means;

first means coupled to said memory means for generating equispaced electrical pulses;

second means coupled to said memory means for generating nonequispaced electrical pulses simultaneously with the operation of said first means;

third means associated with said first means for counting and storing said equispaced pulses;

fourth means including register means for receiving and storing said input information and fifth means for receiving and counting the pulses generated by said second means; and means coupled to said register means and said fifth means for terminating the receipt of electrical pulses being stored by said third means when the number of electrical pulses received accumulated in said fifth means is equal to the first numerical quantity stored in said register means to thereby accumulate a count in said third means representing the logarithm of the numerical quantity stored in said register means.

7. The apparatus of claim 6 further comprising first settable means for controlling said apparatus to perform a multiplication operation;

said third means comprising a bidirectional counter;

means responsive to said first settable means for controlling the direction in which said bidirectional counter is stepped to form the numeric sum of the logarithmic quantities fed to said third means.

8. The apparatus of claim 7 further comprising second settable means for controlling said apparatus to perform a division operation;

means responsive to said second settable means for controlling the direction in which said bidirectional counter is stepped to form the numeric difference of the logarithmic quantities fed to said third means.

9. Electronic apparatus for performing mathematical operations upon input information in the form of numeric quantities comprising:

a surface;

a first pattern of equispaced indicia being provided on said surface;

a second pattern of nonequispaced indicia bearing a predetermined relationship to said first pattern being provided on said surface;

first and second sensing means for respectively sensing said first and second patterns;

means for moving said surface at a predetermined rate relative to said sensing means whereby said first and second sensing means are caused to generate signals at a rate determined by the moving patterns which they sense;

an accumulator coupled to said first sensing means for counting the signals generated by said first sensing means;

a counter coupled to said second sensing means for counting the signals generated by said second sensing means;

a first register for temporarily storing one of the numeric quantities to be operated upon;

comparison means coupled to said register and said counter for generating a terminating signal when the counts in said register and said counter are equal;

gating means normally coupling the output of said first sensing means to said accumulator, said gating means having a control input coupled to said comparison means for decoupling said first sensing means from said accumulator when said control input receives said terminating signal.

10. The apparatus of claim 9 further comprising means coupled to said comparison means for clearing said counter and said first register when said terminating signal is detected;

a second register for storing a second numeric quantity to be operated upon;

means decoupling said comparison means for said first register and coupling said comparison means to said second register, whereby said accumulator again receives signals from said first sensing means until the counts in said second register and said counter are equal, causing said gating means to decouple said first sensing means from said accumulator when said terminating signal is again received.

11. The apparatus of claim 9 further comprising a second register for storing a second numeric quantity to be operated upon;

programming means coupled to said comparison means for coupling said second register to said comparison means and decoupling said first register from said comparison means and for resetting said counter when said terminating signal is detected, whereby said accumulator receives signals from said first sensing means until the counts in said counter and said second register are equal.